Jan. 14, 1964     L. M. ILGENFRITZ ETAL     3,118,062
INFRA-RED DETECTION AND INDICATOR UNITS FOR REMOTE CONTROL
Filed Aug. 12, 1948                    4 Sheets-Sheet 1
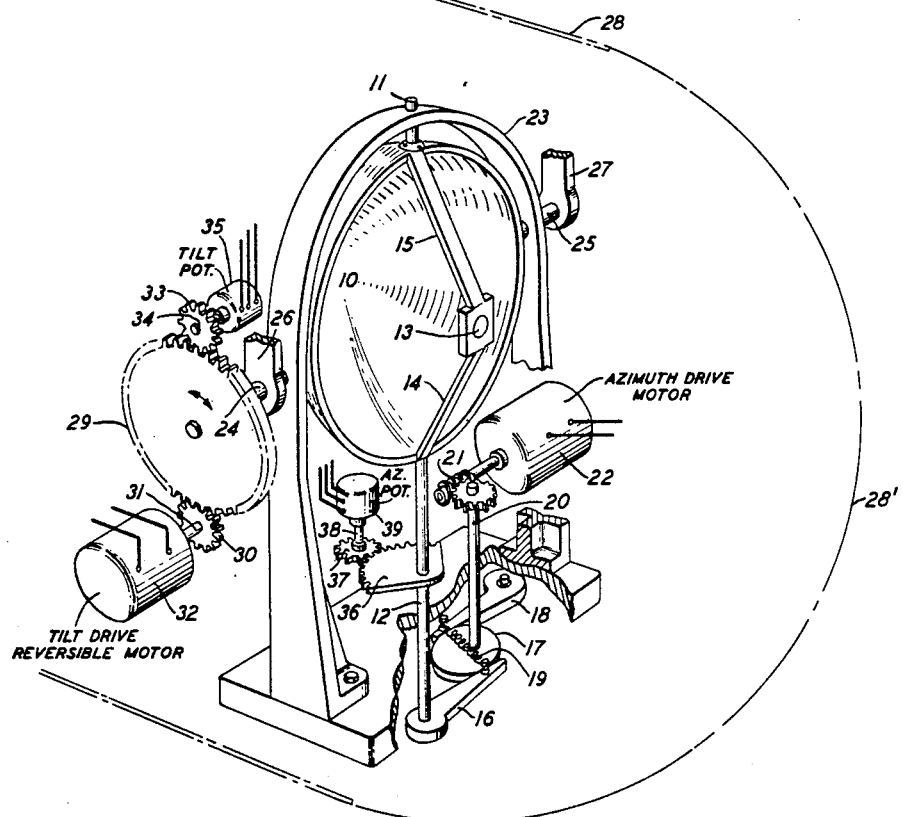
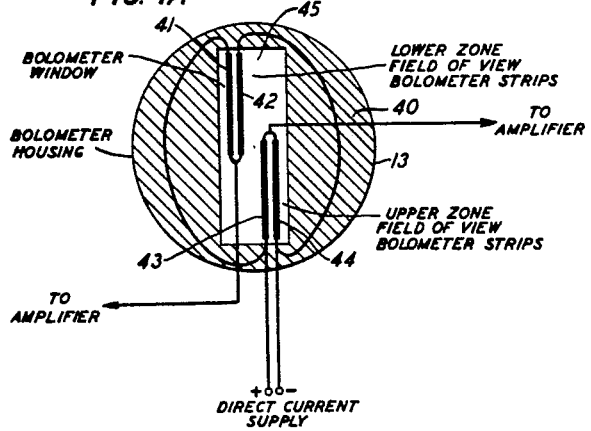
INVENTORS: L. M. ILGENFRITZ
R. W. KETCHLEDGE
H. R. MOORE
BY *G. H. Heydt*
ATTORNEY Jan. 14, 1964  L. M. ILGENFRITZ ETAL  3,118,062
INFRA-RED DETECTION AND INDICATOR UNITS FOR REMOTE CONTROL
Filed Aug. 12, 1948  4 Sheets-Sheet 2

INVENTORS: L. M. ILGENFRITZ
R. W. KETCHLEDGE
H. R. MOORE
BY
G. H. Heydt
ATTORNEY Jan. 14, 1964    L. M. ILGENFRITZ ETAL    3,118,062
INFRA-RED DETECTION AND INDICATOR UNITS FOR REMOTE CONTROL
Filed Aug. 12, 1948    4 Sheets-Sheet 4

FIG. 4

INVENTORS: L.M. ILGENFRITZ
R.W. KETCHLEDGE
H.R. MOORE

BY
G.H. Heydt
ATTORNEY

United States Patent Office 3,118,062
Patented Jan. 14, 1964

3,118,062
INFRA-RED DETECTION AND INDICATOR
UNITS FOR REMOTE CONTROL
Lester M. Ilgenfritz, Mamaroneck, Raymond W. Ketchledge, Jamaica, and Hilbert R. Moore, Pluckemin, N.Y., assignors to Bell Telephone Laboratories, Incorporated, New York, N.Y., a corporation of New York
Filed Aug. 12, 1948, Ser. No. 43,938
15 Claims. (Cl. 250—83.3)

The invention relates to thermal-energy detection systems and in particular to thermal-energy systems and methods of operation by remote control.

An object of the invention is to obtain an improved steering system for a remotely controlled body.

Another object of the invention is to obtain an improved optical system for a moving body.

A further object of the invention is to obtain an efficient communication system between points distant from each other.

A still further object of the invention is to obtain an extended field of view for an observer.

Other objects and uses of the invention will be apparent from a study of the specifications and drawings.

The system according to the invention may utilize thermal-energy radiation from the ultra-violet, visible and infra-red wave bands, or from any one of these wave bands. In a preferred embodiment of the invention infrared radiations of wavelengths from seven thousand to $4 \times 10^6$ angstrom units are utilized.

The system according to the invention is suitable for use in a remotely controlled moving body and is particularly adaptable for use in controlled drone aircraft. The system may be divided into two parts, one part comprising a scanning, thermal-energy collecting and position information transmitting unit, and the other part comprising a receiving, and presentation unit.

In the system according to the invention the guidance of a remotely controlled body containing the scanning, collecting and position information transmitting unit towards thermally detectable destinations or targets, is based upon instantaneous azimuth and elevational bearings of a target in relation to an optical unit situated within the controlled body. This bearing information is transmitted, via cable or radio, or in any other suitable manner, from the controlled body to the remotely situated presentation unit. In the scanning, thermal-energy collecting and position information transmitting unit, thermal-energy signals emanating from an area under observation are collected by a parabolic reflector and directed upon a thermal-energy sensitive unit contained in the controlled body. The sensitive unit may comprise two paired thermal-energy sensitive elements positioned one above the other, and situated in the focal plane of the parabolic reflector. This element arrangement furnishes the system with a vertical field of view divided into an upper view section and a lower view section.

The parabolic reflector is oscillated about a vertical axis in order to provide an azimuthal searching function. Tilting of the parabolic reflector about a horizontal axis may be obtained by use of a reversible motor drive which actuates a gimbal within which the reflector is mounted. The operational direction of the reversible motor is controlled from the remotely situated presentation unit, and this control of the tilt function facilitates a vertical tracking of a target during a level flight approach of the controlled body towards the target.

Target bearing information may be relayed, as stated above, from the controlled body to the remotely situated presentation unit through a multichannel carrier frequency system over a radio connection, a coaxial cable, or through any suitable connecting network. In addition to the transmission of the horizontal and vertical instantaneous angular positions of the scanning parabolic reflector, derivative thermal-energy signals initiated by target traverses upon the upper and/or lower view sections of the field of view are also transmitted to the remotely situated presentation unit.

The bearings of thermal-energy emitting targets detected by the system optical unit, comprising the parabolic reflector and the sensitive elements, are presented in the presentation unit upon an oscilloscope screen, and upon a tilt indicating meter. Targets encountered by the upper section field of view of the optical unit are depicted upon the oscilloscope screen as sharp spikes or pips situated above the screen horizontal base line, while targets seen by the lower section view appear upon the screen below this base line. The screen appearance of equal contiguous and centrally located pips, situated both above and below the base line and bisected by the line, informs an observer that a target is centered across the two view sections of the optical unit. The sweep of the oscilloscope cathode-ray beam in the remotely situated presentation unit is synchronized with the horizontal movement of the system optical unit in the controlled body, in order that the azimuth angle of a target signal appearance may be observed from a scale situated upon the base line on the oscilloscope screen. The vertical angle indicative of the vertical placement relationship between the target and the optical unit may be obtained from the tilt indicating meter.

The preferred embodiment of the invention comprises an infra-red searching and indication system adaptable for use in a remotely controlled moving body. The searching equipment contains an optical unit which includes a bolometer. The bolometer comprises dual sets of thermal-energy sensitive elements, positioned one above the other, and independent of each other, which provide the optical unit with two adjacent vertical fields of view. A signal pulse is initiated by the traverse of a thermal-image of a temperature discontinuity across an element, or elements, during a back and forth regular and repetitive scanning of a panorama by the optical unit. This signal pulse production instant corresponds with the instant that the optical unit is in alignment with the temperature boundary. Separate treatment of signal pulses originated by the traverse of a temperature-discontinuity source across one or two, or all of the sensitive elements provides a basis for a determination of horizontal and vertical bearing angles which are indicative of the location of the searching equipment in relation to the temperature discontinuity. The target signal pulses are processed to remove unwanted components in order to clarify and enhance the reception and resolution of the system. Provision is made for polarity reversal of the processing circuits coincidentally with scan reversals, thereby accounting for the phase reversal of a signal pulse between back and forth scans, and obtaining a rendition of a distinctive signal pulse indication for each scan direction. Target signal pulses may be relayed by radio or cable from the system scanning unit to the system presentation unit, and ultimately appear as upward and downward deflections of a cathode-ray beam upon an oscilloscope screen in the presentation unit. The vertical position of a temperature discontinuity in relation to the searching optical unit is denoted by the comparative amplitude of the upward and downward deflections of the beam, thus providing the vertical bearing of the target relative to the scanning unit. The appearance of contiguous and equal upward and downward beam deflection indications on opposite sides of the oscilloscope base line, informs an observer when the searching optical unit is in vertical alignment with a temperature discontinuity. The azimuth bearing of the searching unit in relation to a temperature discontinuity may be determined by the horizontal position of the target signal indication upon the screen.

A threshold suppression feature is utilized in the presentation unit to prevent the depression of the oscilloscope cathode-ray beam by a target signal pulse of less than a predetermined magnitude. This feature facilitates the recognition of legitimate signals, enhances the resolution of weak signals, and results in the achievement of accurate target bearing information.

Equipment is provided in the system for remotely controlling the vertical tilt of the optical unit in relation to the longitudinal axis of the controlled body. This control of the tilt position of the optical unit facilitates the centering of a temperature-discontinuity source in the system field of view.

Examples of thermal-energy sensitive units commonly used in detection devices are thermocouples, thermopiles, photoelectric cells and bolometers. In the preferred embodiment of the invention, as described herein, a thermistor-bolometer unit is used. A bolometer is a device utilized to detect or measure small quantities of thermal-energy by means of a thermally induced change in the bolometer resistance. The thermal-energy sensitive elements in a thermistor-bolometer are made from a thermistor material which is especially sensitive to temperature changes. Thermistor-bolometers may be manufactured as shown in United States Patent 2,414,792, issued January 28, 1947, to J. A. Becker, and thermistors may be constructed as shown in United States Patent 2,414,793, issued January 28, 1947, to J. A. Becker and H. Christensen, or any other satisfactory methods may be utilized. Thermistors usually are connected as arms in a normally balanced bridge circuit network. A thermal-image of a distant thermal-energy source is formed by reflection upon a thermistor-strip bridge arm, and this image impingement increases the temperature of the strip, changes the strip resistance, and causes a momentary unbalance of the bridge network. This unbalance of the bridge results in a voltage transient across the bridge, and this transient is amplified and fed to signal indicating equipment. The output voltage developed from the unbalance of the bridge circuit network is a measure of the thermal-energy radiations impinging upon the thermistor strip, and receipt of a signal may inform an observer that the detection system is in directional alignment with a thermal-energy source. Approximately $1.0 \times 10^{-9}$ watts of thermal-energy incident upon a thermistor-strip type of bolometer for a few milliseconds may be detected and will vary the temperature of the sensitive strip by about a millionth of a degree centigrade. The system is effective even when a thermal-energy source does not diffuse rays in the visible spectrum.

In scanning a panorama composed of a number of thermal-energy sources a transient voltage pulse is originated by each passage of an image of a temperature-discontinuity source across a thermistor strip. The duration of each transient pulse will depend upon time taken by a thermal-image to cross a strip, upon the thermal-response time of the strip, and also upon the relative dimensions of the thermal-image and the strip.

Referring to the drawings:

FIG. 1 is a schematic drawing of an optical unit in accordance with the invention;

FIG. 1A is a schematic drawing of a bolometer which may be used in the optical unit of FIG. 1;

FIG. 4 is a detailed drawing of a signal presentation circuit which is schematically shown in FIG. 3.

Figure 2:
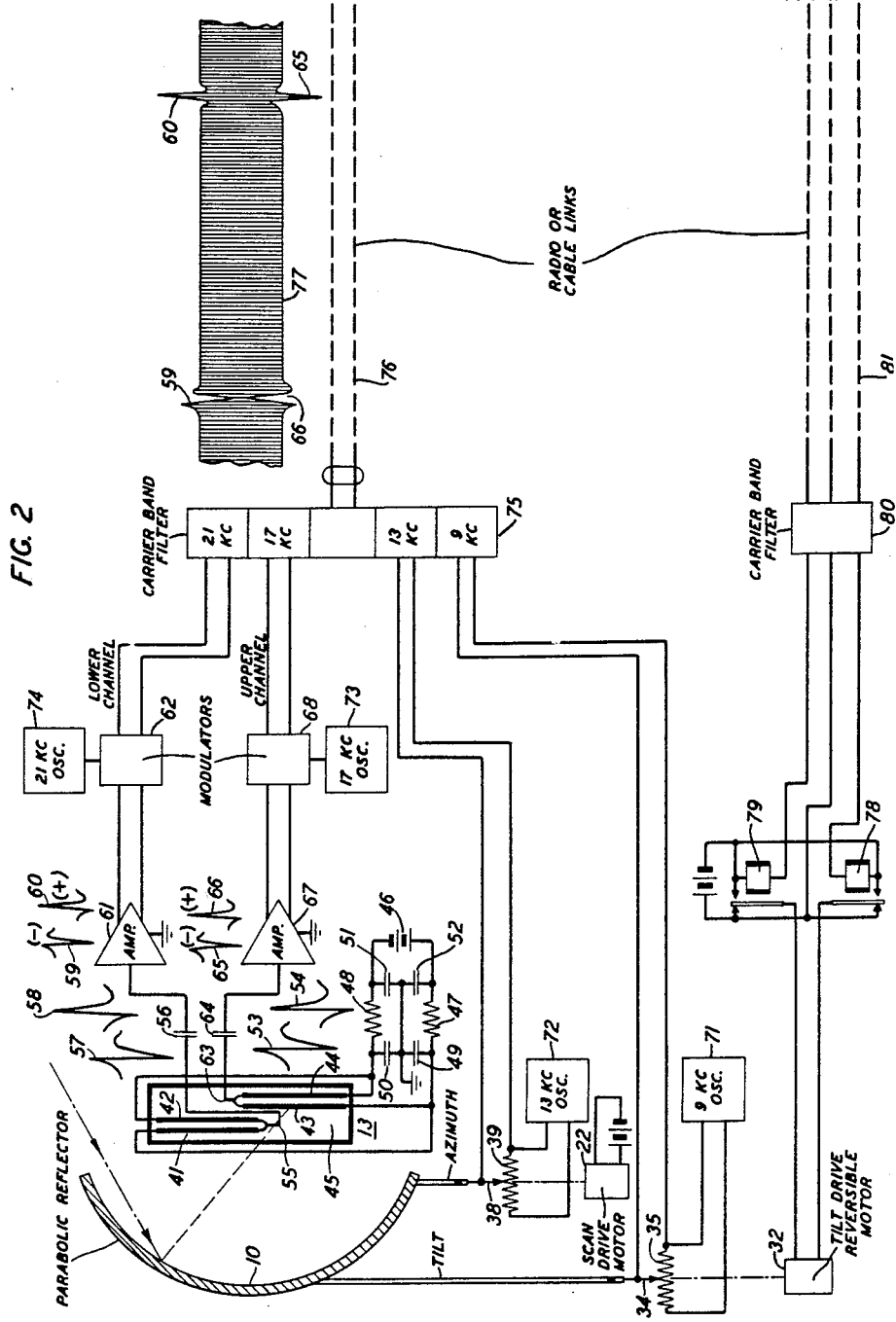
FIG. 2 is a schematic drawing and shows the optical system of FIG. 1, together with an associated circuit network, as used in a controlled body in accordance with the invention.

Referring to FIG. 1 which shows the optical unit of the system and the operating mechanism connected thereto. A scanning parabolic reflector 10 is mounted for oscillation, about a vertical axis, upon a pivot shaft 11 and an aligned drive shaft 12. A bolometer unit 13 is supported in the focal plane of the reflector 10 by rigid spider supports 14 and 15 which extend outwardly from the periphery of the reflector 10. Attached to the shaft 12 is a lever 16 which contacts a cam 17. Also in contact with the cam 17 is an idler lever 18. Levers 16 and 18 are held against the cam 17 by a spring 19. The cam 17 is circular in shape and is secured to a shaft 20 in an eccentric manner as illustrated. The shaft 20 is driven through a worm reduction gear mechanism 21 by a motor 22. The operation of the motor 22 imparts, through the worm gear mechanism 21, shaft 20, cam 17, lever 16 and shaft 12, a sinusoidal type of motion to the scanning parabolic reflector 10. This motion oscillates the reflector 10 about a vertical axis.

The reflector 10 also has a possible freedom of movement about a horizontal axis, for the reflector 10 and the mechanism actuating the vertical movement are contained with a gimbal 23 which is adapted for pivoting upon supporting pivot shafts 24 and 25, the outer ends of which are supported for pivotal movement by vertical supporting posts 26 and 27. The posts 26 and 27 may be suitably supported to the framework of a chamber 28. The chamber 28 contains the remotely controlled scanning, and position information transmitting equipment, and may be hermetically sealed to avoid possible difficulties resulting from the rarified atmospheric conditions prevailing at high altitudes. Sealing of the chamber 28 also facilitates the provision of auxiliary heating of the equipment when it is desirable to offset the low temperatures of the upper air. The chamber 28 may have a window 28' which may be dome shaped, in order to provide strength and streamlining effects.

The scope of the horizontal tilt movement of the gimbal 23 is controlled by a gear 29 which is attached to the horizontal tilt pivot shaft 24. The gear 29 is actuated by a gear 30 which is motivated through a shaft 31 from a motor 32. Also in engagement with the gear 29 is a gear 33. The gear 33 is attached to a potentiometer slider shaft 34 which actuates a tilt potentiometer 35. Attached to the drive shaft 12 is a gear sector 36 which engages a gear 37. The gear 37 is secured to a potentiometer slider shaft 38 which actuates an azimuth potentiometer 39.

It will be understood that the motors 22 and 32 may be energized in any suitable manner, and that the equipment parts shown may be suitably supported.

FIG. 1A is a front end view of the bolometer unit 13 of FIG. 1. Within a bolometer housing 40 are two pairs of thermistor elements comprised of four separate strips 41, 42 and 43, 44. These elements are partially protected from external radiations by the housing 40, but thermal-energy radiations, from the parabolic reflector 10 of FIG. 1, may impinge upon the elements through a window 45. The window 45 may comprise a sheet of silver chloride, or any other suitable material. The elements 41 and 42 comprise a lower zone of the system field of view, while the elements 43 and 44 comprise an upper zone of the system field of view. This apparent transposition of zones is occasioned by the fact that the parabolic reflector, used in conjunction with the sensitive elements, produces a reversed thermal-image of a field of view. The elements 41, 42, 43 and 44 are connected as illustrated, and are biased from a direct-current source as will be explained. The over-lapping of ends of the element pairs precludes the existence of a central inert view zone, and facilitates the location of targets and the centering of these targets in the system field of view.

FIG. 2 is a schematic drawing of the integrated scanning and information transmitting unit. The bolometer unit 13 is shown situated in the focal plane of the parabolic reflector 10. It will be understood that, in the interest of clarity in the drawing, the bolometer unit 13 is shown enlarged in relation to the reflector 10. Also, the bolometer window 45 shown facing the observer, actually faces the parabolic reflector 10, as explained in relation to FIGS. 1 and 1A. The bolometer elements 41, 42, 43 and 44 are biased from a direct-current source 46. The output from the source 46 is led through stabilizing resistors 47 and 48. A series of condensers 49, 50, 51 and 52 are connected across the ends of the series resistors 47 and 48 and one plate of each condenser is connected to ground as illustrated. Two separate bridge networks result, the units 41, 42, 49, 50 form arms of one bridge network, while the units 43, 44, 49, 50 form arms of another bridge network. The source 46 and the condensers 51 and 52 are connected across the bridge networks.

When the parabolic reflector 10 is oscillating about a vertical axis and scanning an area under observation, successive images of units of a panorama are swept across the bolometer elements. In the simple case of a thermal-energy point source, which will occasion a point-instant discontinuity in the energy received from an otherwise uniform background, the passage of a thermal-image of a target across the strip 42 will initiate a heating or cooling of the strip 42, and will result in a small resistance change of the strip, and since there is a direct-current voltage biasing the strips, a corresponding decrease or increase in the voltage drop across the strip 42. As the thermal-image passes beyond the strip 42, the resistance of the strip, and hence the voltage drop, begin to return to their former values. However, as the thermal-image enters upon the strip 41 a similar but oppositely directed voltage change occurs, due to the opposite polarity of the direct-current bias. As a result the rate of change of the potential at a point 55, which is the junction point of the element strips 41 and 42, is the sum of the changes due to the heating or cooling of the strip 42, and the heating or cooling of the strip 41. Finally, as the thermal-image emerges from impingement upon the strip 41, the resistance and voltage drops across the strips 41 and 42 return to normal. The target may initiate different types of signals at different periods of view. A ship located at sea and situated near the horizon usually registers as a "cold" target when viewed in the daytime, while the same ship in the same location usually registers as a "hot" target when viewed at night.

A resulting alternating-current signal, as derived from the potential difference between the junction point 55 and ground, is led from the junction point 55 to a coupling condenser 56. A typical alternating-current signal pulse from the point 55 is shown and titled 57. As the direction of oscillation of the parabolic reflector 10 is reversed, the thermal-image will impinge first upon the strip 41 and secondly upon the strip 42 so the resulting voltage changes are also reversed. A typical alternating-current signal from the point 55 is shown and titled 58. The symbols 57 and 58 depict the basic signals which are usually derived from one, or the other, or both of the twin strip bolometers when a thermal-energy point source or distant thermal-target is scanned. When the target is near and large, two such signals may be obtained, one for each boundary of the target. The coupling condenser 56 may be designed to provide a differentiation of the thermal-energy signals 57 and 58. Differentiated signals are shown and titled 59 and 60, and are characterized by prominent and symmetrical pips or spikes corresponding to the cross-overs of thermal-energy target images from one to the other of the twin bolometer strips 41 and 42. Components of the pips 59 and 60 are ultimately employed in the presentation of target bearing indications on a remotely situated oscilloscope screen, as will be explained. From the condenser 56 the signal pulses 59 and 60 are led to an amplifier 61 and after suitable amplification reach a modulator 62.

The high-frequency response of the amplifier 61 may be restricted, if desired, by the use of shunt capacitances, such as the placing of a condenser in the amplifier input and a condenser at the amplifier output. The cut-off obtained by use of suitable condensers will be sufficiently high to prevent any appreciable attenuation of the thermal-energy signals, but the higher frequency components of thermal-noise background will be substantially attenuated, and the process will result in a corresponding improvement of the signal-to-noise ratio.

Signals originated by the passage of thermal-images across the elements 43 and 44 are processed in a similar manner to those described in relation to the elements 41 and 42. Typical signals are illustrated and titled 53 and 54, and are led from a junction point 63 to a condenser 64. The signals 53 and 54 are differentiated by the condenser 64, and the differentiated signals are shown and titled 65 and 66. From the condenser 64 the signals 65 and 66 are led through an amplifier 67 to a modulator 68 as described above.

It will be appreciated that the utilization of dual sensitive elements comprising the strips 41, 42 and 43, 44, which correspond to the lower and upper separate view zones of the system field of view and are electrically independent of each other, necessitates the employment of duplicate electronic equipment in order to obtain and process two distinct signal channels for transmission to the succeeding and remotely situated presentation equipment unit.

In order that a single radio link or a single pair of wires may convey all the necessary information from the controlled body to the remotely situated presentation unit, four carrier frequencies may be employed. While these carrier frequencies may be of any suitable frequency, frequency oscillators 71, 72, 73 and 74, shown in the drawing, utilize oscillation frequencies of 9, 13, 17 and 21 kilocycles respectively. The oscillation frequencies of the oscillators 73 and 74 may be amplitude modulated in the units 68 and 62 by the signals 65, 66 59 and 60, which originated in the bolometer 13. The oscillation frequency of the oscillator 72 is amplitude modulated by the potentiometer slider arm 38 acting upon the potentiometer 39, and the position of the slider arm 38 is determined by the azimuthal position of the parabolic reflector 10, as was explained in relation to FIG. 1. The oscillation frequency of the oscillator 71 is amplitude modulated by the slider arm 34 acting upon the potentiometer 35. The position of the slider arm 34 is controlled by the vertical tilt position of the optical mechanism, as was explained in relation to FIG. 1. The resultant modulated carrier frequencies are led to a conventional four-channel band-pass filter 75 which couples the channels to a carrier wave output line or radio link 76. A schematic drawing of a carirer output wave envelope from one of the channels, modulated by thermal signals from the bolometer 13 is shown and titled 77.

The vertical position occupied by the parabolic reflector 10 is controlled by the tilt-drive reversible motor 32. The direction of rotation of the motor 32 corresponds to upward and downward movement of the optical unit and is dependent upon the operation of relays 78 and 79. The operation of the relays 78 and 79 is controlled from a carrier band filter 80, in accordance with information received through a link 81 from the remotely situated presentation unit, as will be explained in relation to FIG. 3. The motor 32 may be so connected that operation of the relay 78 may cause the motor to turn in a clockwise direction and raise the optical unit, while operation of the relay 79 may turn the motor in a counter-clockwise direction and lower the optical unit. Movement of the motor 32 moves the connected potentiometer slider arm 34 in a corresponding direction.

Figure 3:
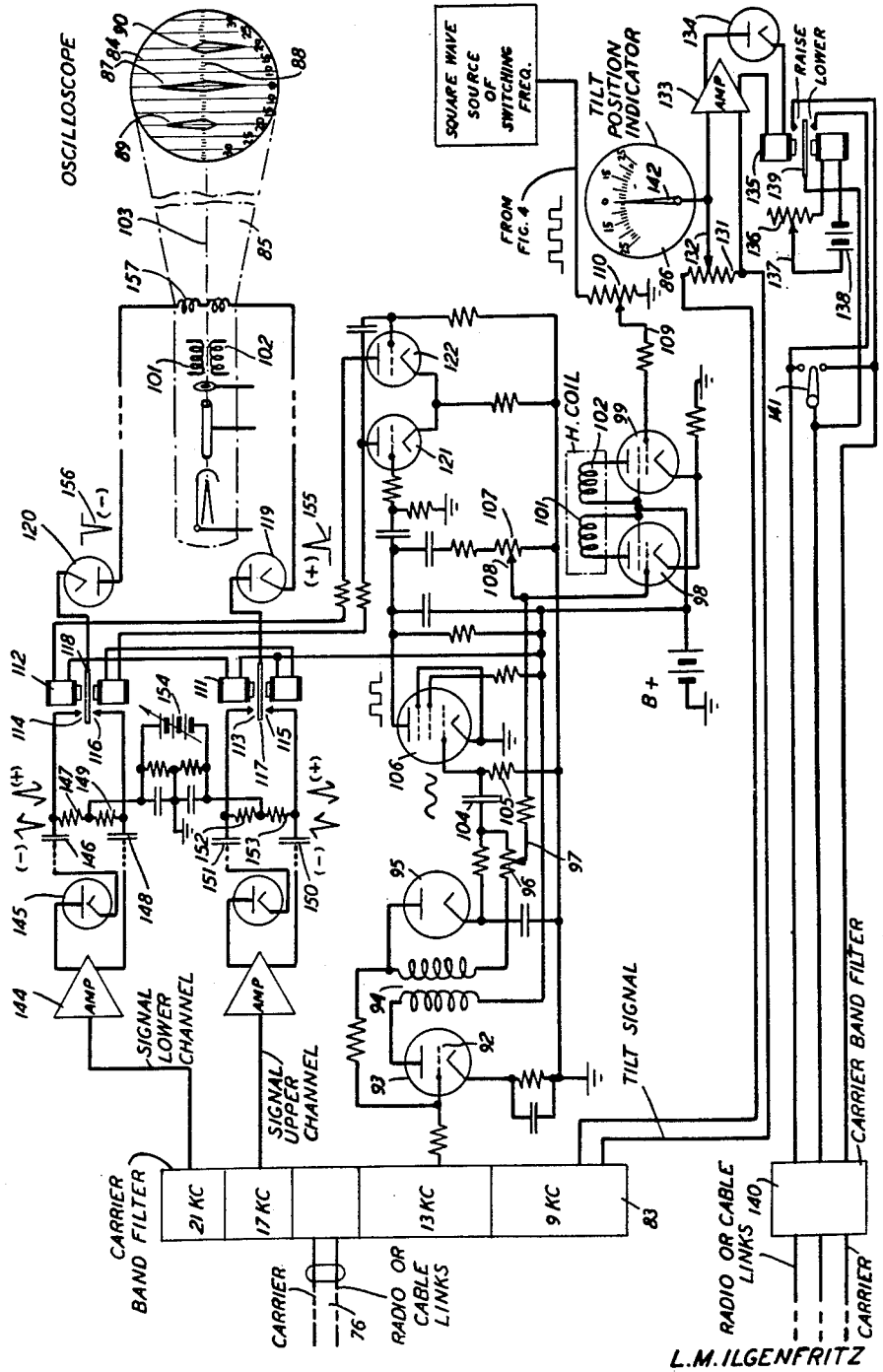
FIG. 3 is a schematic drawing and shows a receiving presentation unit system which is utilized to process bearing information received from the system of FIG. 2.

FIG. 3 is a schematic drawing showing a circuit of the presentation unit for utilizing the bearing and other information received from the controlled body system of FIG. 2. The modulated carrier wave link 76, from the transmitter, situated in the controlled body is received at the presentation unit and passes into a four-channel carrier band filter 83. The four modulating frequencies comprising the 21-kilocycle lower field of view signal, the 17-kilocycle upper field of view signal, the 13-kilocycle azimuth signal and the 9-kilocycle tilt signal, are separated from the carrier by the carrier band filter 83, in a manner well known to those skilled in the art. These separated signals when processed, as will be explained, are utilized to produce signal indications upon a screen 84 of an oscilloscope 85, and upon a tilt position indicator 86.

When a thermal-energy target is centered by the optical system, contained in the remotely situated controlled body, the fact will be indicated upon the oscilloscope screen 84 of the oscilloscope 85 by a signal indication 87. The signal indication 87 comprises two equal contiguous pips which are situated above and below a base line 88. The signal indication 87 is bisected by the base line 88. The top half of the signal indication 87 comprises a signal pulse from the upper zone field of view, while the bottom half of the signal 87 represents a signal pulse from the lower zone field of view. The appearance position of the signal 87 at the central point of the base line 88 is controlled by the azimuth signal received at the carrier band filter 83. The placement of the signal 87 informs an observer that the target is centered by the optical system of the controlled body. Should the target be in horizontal alignment with the optical system, but not in alignment with the vertical axis of the controlled body, the signal 87 would appear situated to either side of the central point of the base line 88, and since the base line 88 may be calibrated in degrees, the off center position of the signal in terms of degree is readily available. If the target is not in alignment, with the vertical and horizontal axes of the controlled body, the target indication may be similar to the indications 89 or 90.

The screen appearance of a target signal indication 89 indicates that the target is situated to the left of the vertical axis of the controlled body, and also informs an observer that the target is predominantly situated in the upper zone of the system field of view, for the signal indication is not centered, balanced upon and bisected by the base line 88. The amount of vertical tilt necessary, for a vertical balance of the signal indication 89, may be obtained from the tilt indicator 86, as will be explained. The signal indication 90 shows a target situated to the right of the vertical axis of the controlled body, and predominantly situated in the lower field zone of view.

The output of the 13-kilocycle azimuth signal portion of the carrier band is led to a control grid 92 of an amplifier 93, and thence through a transformer 94, to a carrier frequency rectifier 95. The azimuth sweep signal is tapped from a potentiometer 96 by a potentiometer slider arm 97, and is applied to azimuth sweep-driver tubes 98 and 99. The tubes 98 and 99 energize horizontal coils 101 and 102, which deflect a cathode ray beam 103 in the oscilloscope 85 in synchronism with the oscillations of the remotely situated optical unit in the controlled body.

The azimuth sweep signal from the rectifier 95 is also applied to a differentiating and phase shifting circuit comprising condenser 104 and resistance 105 which shifts the signal phase ninety degrees. This portion of the azimuth sweep signal is amplified and limited by tube 106 so as to obtain an additional sweep signal square-wave component which is fed to the horizontal deflection coil circuit through a potentiometer slider arm 108, and is adjustably controllable by actuation of a "delay" potentiometer 107 and the potentiometer slider arm 108. This sweep signal square-wave component comprises a square-wave of the fundamental scan frequency whose sense is to retard the horizontal sweep of the beam 103 in the oscilloscope 85. The purpose of adding the scan frequency square-wave component is to compensate for time delays in the signal amplifiers and bolometers, in order that the deflections of the beam 103 may occur at the same bearing point, regardless of whether the scan is to the right or left of the vertical axis of the remotely situated optical unit. This compensating voltage is added in such a sense as to shift the oscilloscope sweep. This shift, in effect, delays one direction of sweep with respect to the reverse direction. Without the compensating factor the beam spot at a given time instant of a target signal occurrence might be located along the oscilloscope horizontal base line at a point ahead of where it should be situated in order to correspond to, and coincide with, the position of target signal occurrence on a reverse scan movement at the correct time instant. The compensating factor is similar in effect to a mechanical backlash compensation in gearing, and correlates the positions occupied by the electron beam, with the target signal time instant, in both directions of beam movement, by delaying the beam movement in the requisite direction. This correcting beam delay compensates for the time delay of the detecting elements and amplifiers, and causes a signal to appear at the same point or bearing regardless of the direction of scan. When a target signal is received this "delay" feature may be adjusted to cause signals, from left and right scans which occur at the same target bearing, to accurately superimpose upon each other on the oscilloscope screen.

Polar relays 111 and 112 are operated from the azimuth sweep differentiation circuit in order that the operational direction of relay armatures 117 and 118 may be synchronized with the scanning oscillating directions of the remotely situated optical unit. Accordingly, the operational current of the relays 111 and 112 is derived from the azimuth scan signal initiated at the potentiometer slider arm 38 of FIGS. 1 and 2. This signal wave is sinusoidal in shape and a positive operation of the relays 111 and 112 at the end of each scanning oscillation of the remotely situated optical unit is obtained because the signal is at a maximum at each limit of motion. The signal wave is limited by the tube 106, the output of which controls switching tubes 121 and 122, so as to provide a square wave at the relay windings to assure the positive and rapid operation of the relays coincidentally with the instant changes of directions of the remotely situated optical unit.

Since the windings of the relays 111 and 112 are energized by a square wave of horizontal scan frequency, opposite relay contacts 113, 114 and 115, 116 are engaged by the armatures 117 and 118 on opposite directions of scan, and the operational directions of the relays are reversed to compensate for polarity reversals of the azimuth signal pulses. Since the polarity of the signal pulse reverses with the direction reversals of the scanning oscillations of the optical unit, operation of the relays 111 and 112 reverses the polarity of the target signal paths as the scan direction reverses, thereby maintaining the polarity of the signal pulses, fed to tubes 119 and 120, at a constant polarity irrespective of the direction of the scanning oscillation.

The dual sensitive elements in the bolometer are arranged with their ends overlapping as shown in FIG. 1A, and this arrangement may result in an offset between the two zones of the field of view. If this feature were not compensated for, a target common to both zones of view would have different bearing indications recorded upon the oscilloscope screen 84. In order to compensate for the offset condition, so that target signals initiated in either view zone will appear at the same bearing point upon the oscilloscope screen, an adjustment signal comprising a square wave of a switching frequency, of approximately four thousand cycles per second, is introduced into the horizontal sweep circuit from a potentiometer 110 via a potentiometer slider arm 109 to a control grid of a driver tube 99. The magnitude of this adjustment signal is controlled by operation of the slider arm 109. The tubes 98 and 99 operate in push-pull relationship and swing the beam horizontally from left to right. The small disturbing square-wave compensation voltage, from the potentiometer arm 109, which is superimposed upon the voltage on the grid of tube 99, deflects the cathode ray beam 103 in the oscilloscope 85, to the left and right of a given point, as an electronic switch transfers target signals from diodes 119 and 120, as will be fully explained in relation to FIG. 4.

If it is desired to move the upper zone view to the right, and the lower zone view to the left, in order to achieve a coincidence to the target signal indications at a bearing point, the compensating square wave of switching frequency is introduced in an appropriate sense to deflect the cathode ray beam to the right when the electronic switch is passing target signals originated in the upper zone of the field of view to the vertical deflecting coils, and then to deflect the beam to the left when the electronic switch is passing target signals from the lower zone of the field of view.

The output from the 9-kilocycle tilt signal channel is led through a potentiometer 131, a potentiometer slider arm 132, and amplifier 133 and a carrier frequency rectifier 134, to an upper winding of a differential polar relay 135. A lower winding of the relay 135 is energized through a variable resistance 136 and a potentiometer slider arm 137, from a direct-current source 138. When the output from the 9-kilocycle tilt signal portion of the carrier band filter 83 is of a higher potential than the potential of the output from the source 138, an armature 139 of the relay 135 will be attracted towards the upper pole-piece of the relay and will contact the upper contact of the relay. This operation completes the operation circuit of the relay 78, of FIG. 2, through a carrier band filter 149, the radio or cable link 81, and the receiving carrier band filter 80 of FIG. 2. Operation of the relay 78 energizes the tilt drive reversible motor 32 of FIG. 2 in a clockwise direction of rotation, and causes the raising of the optical unit in the remotely controlled body, as was explained.

The raising action of the optical unit is communicated to a tilt potentiometer 35 connected to the optical unit by the slider arm 38, as was explained in relation to FIG. 2, and a tilt signal, modulated in accordance with the extent of the upward raising of the optical unit, is received back at the carrier band filter 83. The raising movement of the optical unit will continue until the modulated tilt signal received at the relay 135 from the carrier band filter 83 is reduced to potential equality with the output from the direct-current source 138. When this output potential equality is obtained the armature 139 is restored to a normal nonoperated condition. Conversely, if the output from the 9-kilocycle tilt portion of the carrier band filter 83 received at the upper winding of the polar relay 135 is less than the output from the source 138, the armature 139 is attracted towards the lower relay contact and the optical unit in the controlled body is tilted downwards, and effects an increase in carrier level until the operational balance of the relay 135 is restored.

The remotely situated optical unit may also be manually tilted by operation, in an upward or downward direction, of a switch 141. Actual control of the tilt sequences is obtained by adjustment of the slider arm 132 in relation to the potentiometer 131, and of the slider arm 137 in relation to the potentiometer 136. The output of the tilt signal channel may be regulated by the units 131 and 132. When this output is increased the optical unit is raised, and when the output is decreased the optical unit is lowered. An indicator pointer 142, of the tilt position indicator 86, is connected to the potentiometer slider arm 132, and the scale on the indicator 86 may be calibrated to indicate the actual tilt angles of the scanner in relation to a horizontal axis.

The judgment of a control operator of the requisite tilt manipulation, to obtain a vertical balance of the target in relation to the optical unit, is based upon the appearance of the target signal indications upon the oscilloscope screen 84, and upon observations of the tilt position indicator 86. On an approach to a target in level flight the first signal indication may be a pip, wholly or predominantly, in the lower field of view zone similar to that shown and tilted 90. This indication would indicate a need to tilt the optical unit in the controlled body downwards so that a symmetrical signal pattern would be obtained when the target falls equally in the upper and lower fields of view zones. If the tilt were exceeded the pip would appear similar to that shown and titled 89, and would indicate a need to raise the optical unit. Vertical bearings are obtained from the tilt position indicator 86 when the symmetrical pip signal is achieved.

The thermal-energy target signals produced in the upper and lower field zones of view of the optical unit are received and separated by the carrier band filter 83. The lower field zone of view signal carrier is applied to an amplifier 144, and thence to a carrier frequency rectifier 145. The signal from the rectifier 145 passes through a filter network, which is not shown in this schematic drawing, but which shall be fully described in relation to FIG. 4. The filter network filters out residual carrier frequency components and the modulation target signal originally imposed on the carrier wave remains. The signal wave is also divided in half by the balanced filter network and one-half of the carrier target signal is applied through condenser 146 to a resistance 147, the other half of the signal is applied through a condenser 148 to a resistance 149. In a similar manner the target signals of the 17-kilocycle upper zone field of view are received at the carrier band filter 83 and applied through condensers to resistances 152 and 153.

A variable direct-current bias from a source 154 is applied to the target signal output circuits so as to provide a threshold suppression feature to prevent the depression of the beam 103, of the oscilloscope 85, by any signal pulse of less than a predetermined magnitude. The variable direct-current threshold bias potential applied to the target signal circuits also tends to reduce or remove extraneous noises which may be present in the target signal circuit. If the target signals are of a lower potential than the potential of the direct-current bias, the half-wave rectifiers 119 and 120 will not conduct the lower potential target signal. However, if the target signal is of a higher potential than the potential of the direct-current bias, the rectifiers 119 and 120 will conduct the target signal, and a target signal indication will appear upon the oscilloscope screen. By accurately adjusting the threshold circuit extraneous noises may be removed or reduced without appreciable loss of the system target signal detection ability. This threshold feature assists in the achievement of accurate bearing information by enhancing the resolution of weak and legitimate target signals, and by the reduction or removal of the extraneous noises which may be normally present. The threshold bias circuit is schematically illustrated in FIG. 3, but will be shown in detail and fully explained in relation to FIG. 4.

It is possible to obtain further clarification of the thermal-energy target signal pulse by removing the two smaller pulses and by retaining the large central pulse. This clarification is achieved by feeding the two minor pulses, which are of opposite polarity to the major pulse, to the half-wave rectifiers 119 and 120. The signal input to the rectifiers 119 and 120 should be poled in accordance with the direction of oscillation of the scanning parabolic reflector in the controlled body, so that the final target indication signal will be composed of unidirectional signals of opposite polarity as represented by the symbols titled 155 and 156. This poling objective is attained by use of the relays 111 and 112 which, as explained, are energized by the output of the 13-kilocycle azimuth channel from the carrier band filter 83. The direction in which the relays 111 and 112 are energized must be appropriate for the polarity of the azimuth signal output at a particular instant, and the polarity of the signal output is, as has been said, dependent upon the direction of oscillation of the parabolic reflector in the controlled body. Thus the polarity of the thermal-energy target signals from the 17- and 21-kilocycle channels are reversed to accommodate the reversal of the target signal pulses, in accordance with reversal of the oscillation direction of the parabolic reflector. Accordingly, the target signal pulses received at the plate of the rectifier 119 will always be positive, while the target signal pulses received at the plate of the rectifier 120 will always be negative. The rectifiers 119 and 120 pass the major central spike of the target signal pulse, and do not pass the minor reversed end pulses. The outputs from the rectifiers 119 and 120 are applied through an electronic switching circuit to the vertical coils 157 of the oscilloscope 85 in a manner that will be explained in detail in relation to FIG. 4.

Referring to FIG. 4, which is a detailed drawing of the target signal presentation circuit schematically shown in FIG. 3, the target signal modulated carriers from the radio or cable link are separated by the carrier filter 83. The target signal carrier from the lower zone of the field view is applied to a grid 160 of an amplifier tube 161, and the amplified output from the tube 161 is received at a transformer 162, and applied to a carrier frequency rectifier 145. A rectified signal is passed from the rectifier 145 to a by-pass condenser 164 which charges with a voltage proportional to the signal amplitude. The residual carrier frequency components of this proportional voltage are removed by a filter network comprising resistors 165, 166, 167 and 168, together with condensers 169 and 170, and remaining is the modulation target signal originally impressed upon the carrier wave. The resistances 166 and 167 are equal in resistance value and divide the target signal in half. One-half of the divided target signal is applied through a condenser 148 to a resistance 149, while the remaining half of the divided target signal is applied through a condenser 146 to a resistance 147. The division of the target signal into two-half portions results in the application of a half target signal portion to the upper contact 114 of the relay 112, and of the remaining half signal portion to the lower contact 116. If the voltage applied to the contact 114 is of a positive polarity, the portion applied to the contact 116 will be of a negative polarity, for these applied voltages are equal in amplitude but of opposite polarity with respect to ground. Since the direct-current components in the output from the rectifier 145 are removed by the condensers 148 and 146, the alternating-current components on the contacts 114 and 116 of the relay 112 are actual amplified versions of the target signal pulses originated in the lower zone field of view of the remotely controlled body.

In a similar manner as described above, the upper zone field of view target signal carrier is applied to a grid 175 of an amplifier 176 and passed by a transformer 177 to a rectifier 178. A balanced resistance-capacitance network filters out the residual carrier frequency components and leaves the modulated target signal, which is then divided into two halves of equal voltage value, but of an opposite polarity to each other with respect to ground. One-half of the divided signal is applied to the upper contact 113 of the relay 111, while the remaining half is applied to the lower contact 115, and these halves represent target signal voltages derived from the upper zone field of view. The functions of the relays 111 and 112 have been explained in relation to FIG. 3.

A variable direct-current threshold bias intended to facilitate the suppression of unwanted noise signals is introduced into the filter network circuits at junction points 179 and 180. The junction point 179 may be supplied with a positive direct-current bias, while the junction point 180 may be supplied with a negative direct-current bias. These bias potentials originate at a terminal 181, which may be energized in any suitable manner such as by the output from a power transformer, so that a potentiometer 182 may be supplied with an alternating current of power frequency. The voltage output of the potentiometer 182 is adjustably controllable by a slider arm 183, in order to obtain resultant bias voltages of any desired value. The output from the slider arm 183 is led to rectifiers 184 and 185. The outputs of the rectifiers 184 and 185 are led through equal value resistances 186 and 187 as illustrated. Resistors 188 and 189 are also of equal resistance value, so that the direct-current bias fed to the junction point 179 is of equal amplitude but opposite polarity to the direct-current bias fed to the junction point 180.

The threshold bias received at the junction point 179 acts in preventing the conduction of the diode 120 on receipt of weak signals and extraneous noises, while legitimate target signals will tend to overcome the resistance of the bias voltage and to pass through the diode 120 to a potentiometer 190. From the potentiometer 190 the target signals pass via a slider arm 191 to a control grid 192 of a tube 193.

The threshold bias developed by the rectifier 185 is applied to the junction point 180 in order to act as a threshold control on the conduction of the diode 119. The output of the diode 119 is fed, via a potentiometer 194 and a potentiometer slider arm 195, to a control grid 196 of a tube 197.

The tubes 193 and 197 operate as a high frequency electronic switching circuit so as to provide for the presentation on a shared-time basis of the target signal outputs from the diodes 119 and 120. The tubes 193 and 197 are driven by a multivibrator tube 198 so that the upper and lower zones of view signals are alternately connected from tubes 193 and 197 to amplifier tubes 199 and 200. The tubes 199 and 200 feed vertical deflecting coils 201 and 202 of an oscilloscope system 203. During the instant that the target signal control is shifted between tubes 193 and 197 the oscilloscope beam 204 is blanked by a negative pulse on a control grid 205 from a tube 206, as will be explained.

The signal fed to the control grid 192 of the tube 193 comprises negative signal pulses derived from the lower zone field of view, while target signals reaching the control grid 196 of tube 197 comprise positive signal pulses derived from the upper zone field of view. This opposite polarity feature is achieved by the fact that the poling of the diode 119 is reversed with respect to the diode 120.

Adjustments of the slider arms 191 and 195 in relation to the potentiometers 190 and 194 controls the amounts of target signal voltages fed to the tubes 193 and 197. This control feature is utilized to adjust the height of target signal indications appearing on the screen of the oscilloscope 203.

As stated, the tube 198 operates as a conventional multivibrator at a suitable rate of oscillation, which may be about four thousand cycles per second. A tube 207 amplifies a square-wave output generated by the tube 198, and also aids in obtaining flatness of the tops of the square wave. The square-wave output from the tube 207 is fed to condensers 214 and 215.

The condensers 214 and 215 pass the square wave to resistors 216 and 217, and thence to suppressor grids 208 and 209 of the electronic switching tubes 193 and 197. One of the suppressor grids 208 or 209 is driven positive, and the remaining suppressor grid is driven negative by the action of the square wave. The plate current of the tube with the negative suppressor grid is disabled and no electrons reach the plate, thereby disabling the passage of target signals through this tube. The tube with the positive suppressor grid acts as an amplifier and will feed target signals to a control grid 220 of the tube 199. By utilizing a moderately high cathode bias resistance 221, the tube 200 acts as a cathode-driven amplifier. Operation of the tube 290 is controllable by adjustment of a slider arm 218 in relation to a potentiometer 219. The tubes 199 and 200 combine to supply deflection current to the vertical deflection coils 201 and 202 of the oscilloscope 203. One field of view is presented during a particular half-cycle operation of the electronic switch, comprising tubes 193 and 197. By use of the rectifiers 119 and 120, together with other devices previously described, the signals from one zone of the field of view comprise pulses of a definite polarity, while the signals from the other zone of the field of view comprise pulses of an opposite polarity. Accordingly, target signals in the upper zone of the field of view may deflect the electron beam 204 upward, while target signals in the lower zone field of view may deflect the beam 204 downward. When target signals from both fields of view are simultaneously present, the beam deflection rapidly switches between the target signals so as to simultaneously produce both upward and downward target signal indications from a single electron beam.

The use of direct coupling, between the electronic switch and the vertical deflection coils, assures the stability of the oscilloscope base line in the presence of target signals. The presence of target signals normally tends to move the base line, unless frequencies down to direct current are passed. The coupling system allows each target signal to be presented in an analogous manner to a dashed or broken line, and utilizes the spaces between the dashes to write out another target signal in a similar manner.

The square wave from the tube 207 is also led to a cathode-ray tube blanking circuit comprising condensers 210 and 211 which feed resistors 212 and 213. The time constant of the blanking circuit is of a sufficiently short duration that the tube 206 receives the square-wave pulses in a differentiated form. Thus the voltages at the junction point of the condenser 210 and resistor 212 comprises a series of short pulses which are alternatively positive and negative, while at the junction point of condenser 211 and resistor 213 the voltages are of equal intensity but opposite polarity to those at the first-mentioned junction point. The diodes of the tube 206 are so poled that at each reversal in the polarity of the square wave a short negative pulse is applied across a resistor 222. A series of these negative pulses is fed via a blocking condenser 223 to the grid 205 of the oscilloscope 203, thereby extinguishing the cathode-ray beam 204 at the instant of the polarity reversal of the square wave. Accordingly, the cathode-ray beam 204 is momentarily extinguished as the polarity reversal of the square wave reverses the electronic switch, comprising the tubes 193 and 197. The momentary removal of the beam 204 prevents transient indications due to the operation of the electronic switch from appearing upon the screen of the oscilloscope 203.

The square-wave output of four thousand cycles switching frequency from the multivibrator 198, is fed via the tube 207 to a potentiometer 110 and a potentiometer slider arm 109, and thence to the horizontal sweep circuit to obtain a horizontal adjustment of the cathode-ray beam 204, as was explained in relation to FIG. 3.

It is to be understood that the above-described embodiments are illustrative examples and that various modifications may be made without departing from the spirit of this invention.

What is claimed is:

1. In a system for the presentation of thermal-energy emissions emanating from an object situated in an area of scan and depicted as signal bearing indications upon a remotely situated oscilloscope screen the combination of, an optical unit, means for causing said unit to scan said area, a pair of dual elements sensitive to thermal-energy radiations in said unit, said elements positioned one above the other so as to provide said unit with separate but adjacent fields of view, means in said unit for collecting thermal-energy radiations from said area and focussing them upon said elements, indication circuits individual to each of said dual elements, means for originating electrical variants in either of said circuits in response to variations in the thermal-energy radiations impinging upon any of said elements, an oscilloscope system, said system having a screen, means for producing an electron beam, means for causing said beam to sweep over sections of said screen, said oscilloscope system connected to said indication circuits, means for synchronizing the sweep of said beam with the scanning movement of said optical unit so that parts of the sweep of said beam are coincident to like portions of the scanning movement of said optical unit, and means for producing vertical deflections of said beam in accordance with said electrical variants, so that bearings of said object in relation to the axis of said optical unit are denoted by the instant vertical deflections and positioning of said beam.

2. In a system for the presentation of thermal-energy radiations emanating from an object in an area of observation and depicted as signal bearing indications upon a remotely situated indicator, the combination of, a plurality of thermal-energy sensitive elements each responsive to a separate but adjacent field of view, and so arranged that they divide the orbit of said system into two independent zones of view, means for collecting thermal-energy radiations from said area and directing them upon said elements respectively, means for originating electrical variations in response to variations in the amounts of thermal energy impinging upon said elements, means for translating said variations into pulses having a polarity that is arbitrarily distinctive of each of said zones, and means responsive to said pulses for producing a visual indication of the bearings of said object relative to said elements.

3. A thermal-energy scanning and remotely situated presentation system including in combination, azimuthal scanning means for scanning an area and receiving thermal-energy radiations from said area, said scanning means comprising an optical unit including a reflector and dual thermal-energy sensitive elements which divide the orbit of said optical unit into two zones of view, an indicating system including electron beam producing means and electron beam deflection control means, means for synchronizing movement of said beam with movement of said scanning means, and means for applying control effects to said deflection control means in accordance with variations in the amounts of radiations received by each of said dual element pairs.

4. In an thermal-energy detecting system for scanning an area to obtain information of temperature discontinuities situated within said area the combination of, an optical device adapted to perform a panoramic scanning of said area, said optical device including dual pairs of thermal-energy sensitive elements arranged one pair above the other to divide the orbit of said optical device into two zones of view, and a collecting means for gathering radiations emanating from thermal-energy sources within said area and directing them upon said elements in accordance with the angular instant positions of said sources in relation to said elements, circuit means individual to each of said element pairs for originating electrical pulses corresponding to variations in the amounts of radiations collected, and transformation means for processing said pulses and producing therefrom equal pulses of opposite polarity, said transformation means comprising a balanced resistance-capacity circuit network.

5. In a thermal-energy indication system for pre-sending upon the screen of an oscilloscope visual images of temperature-discontinuity sources situated within an area under observation the combination of, an optical unit for scanning said area, said unit comprising two individual view sections and collecting equipment for receiving thermal-energy radiation from said area and directing it upon said sections, circuit means individual to each of said sections for initiating electrical pulses in accordance with variations in the amounts of radiation directed upon said sections, an oscilloscope system connected to said circuit means and comprising an electron-beam producing means, beam deflection means, and a screen, electronic switching means for presenting on a shared-time basis on said screen individualistic patterns corresponding to pulses from each of said sections, said switching means comprising thermionic tubes and an actuating multivibrator device, said tubes feeding the output of said circuit means to said deflecting means, and means for blanking said electronic beam in said oscilloscope system during intervals occurring between the operations of said tubes.

6. In a thermal-energy presentation system for receiving thermal-energy signals and depicting them as visual indications the combination of, means for scanning an area under observation, means for initiating electrical pulses corresponding to temperature discontinuities encountered in said area, filter means for processing said pulses to elminate unwanted components thereof, indicating equipment including electron beam producing means, controlling means therefor, and an indicating surface upon which said electron beam may inpinge, means for causing said beam to sweep across said surface repeatedly in a forward and a reverse direction, and automatic means for introducing appropriate time delays in the forward and reverse sweeps of said beam, said time delays corresponding to time delays in the travel of said pulses from said pulse initiating means to said controlling means.

7. In a thermal-energy system for scanning an area to obtain indications representing the presence of temperature-discontinuity sources within said area the combination of, optical means for scanning said area in a back and forth repetitive manner, said optical means comprising an oscillating parabolic reflector and a pair of thermal-energy sensitive elements situated in the focal plane region of said reflector, said element pair being electrically independent of each other and said pair, together with said reflector, furnishing said system with two independent zones of view, circuits individual to each of said element pairs, means under control of each of said element pairs for initiating voltage variations in said circuits whenever a temperature-discontinuity source is encountered by said optical means, said voltage variations being of an instant polarity in relation to the instant travel direction of said reflector when said voltage variations are initiated, and means in said circuits for translating said voltage variations into pulses having a polarity that is arbitrarily distinctive of each of said independent zones of view, said translating means comprising a balanced network and switching devcies which are energized upon each end reversal of each movement direction of said optical means.

8. In a thermal-energy detection and presentation system the combination of, thermal-energy sensitive means comprised of dual units, oscillating scanning means to obtain a panoramic scanning of an area under observation, said scanning means receiving thermal-energy radiation from objects in said area and directing it upon said units in accordance with the position of said object with respect to said scanning means, means for originating electrical pulses in accordance with variations in the amounts of thermal energy collected, said pulses being of opposite polarities for opposite directions of scan, and means for reversing the polarity of only those pulses which are produced during alternate half-cycles of the oscillatory scanning movement, said reversing means comprising a switching device energized upon each end reversal of said oscillatory scan.

9. In a thermal-energy presentation system for receiving thermal-energy signals and depicting them as visual indications upon an oscilloscope screen, the combination of, an oscilloscope system including electron beam producing means, beam deflection means and a screen, means for collecting thermal-energy radiations from two zones of view, means for initiating electrical pulses in accordance with variations in the amounts of said thermal-energy radiations received from said zones, means for connecting said pulse initiating means to said beam deflection means, and means associated with said connecting means for suppressing the passage of pulses of less than a predetermined magnitude.

10. In a thermal-energy detection system the combination of, an optical unit for scanning a panorama, said unit having vertical and horizontal axes, means for moving said unit about said vertical axis, means for moving said unit about said horizontal axis, a remote control device, means for transmitting to said device signals representative of the instant placement relationship of said optical unit and said vertical and horizontal axes, and means for controlling said vertical moving means to adjust said placement relationship.

11. In a thermal-energy detection system for scanning an area to detect and locate thermal-energy sources, said sources emitting thermal-energy radiations of a greater or lesser degree than their surroundings, the combination of, an optical device adapted to perform an oscillatory azimuthal scanning of sections of said area, said device comprising thermal-energy collecting equipment and a thermal-energy sensitive unit, means for tilting said optical device in vertical directions, said tilting means comprising tilting mechanism mechanically connected to said optical device and actuated by signals transmitted from a remotely situated control unit in response to signals transmitted to said unit from said optical device.

12. In a system for the visual presentation of representations of thermal-energy radiations emanating from an object in an area of observation the combination which comprises, means providing a surface with a datum line inscribed thereon in relation to which the visual representation is to be formed, electron beam means for producing at any point upon said surface a visible impression, means operative on said beam for moving the point of impression progressively in one direction along said datum line and repeatedly in a reverse direction from one predetermined limit to another, positions of said point in either direction being individual to respective instants of time, means for synchronizing said beam movements with the panoramic scanning of an optical unit so that given parts of the beam movement are proportionate to like parts of the scan movement, and means for deriving from said thermal-energy radiations, and applying to the beam deflection control, effects representative of horizontal bearing relationships of said optical unit and said object.

13. The method of producing a signal pulse corresponding to the traverse of an optical unit comprising two independent view zones across a source of temperature discontinuity situated in an area of observation which comprises, subjecting an oscilloscope screen to impingement of a beam of radiant-energy, synchronizing the sweep of said beam with movements of said optical unit, and presenting on said screen on a shared-time basis individual signal patterns for each view zone.

14. In a thermal-energy presentation system for receiving thermal-energy signals and depicting them as visual indications upon an oscilloscope screen the method comprising, dividing an area under observation into two zones of view, collecting thermal-energy radiations from each view zone, initiating a dual set of signal voltages in accordance with variations in the amounts of radiations collected from either zone of view, impressing a bias voltage upon each of said signal voltages, said bias voltages being variable simultaneously in their amplitudes at will and always of equal magnitude but opposite polarity to each other, and the effects of said bias voltages upon said signal voltages suppressing signal voltages of less than predetermined magnitudes.

15. In a thermal-energy system for receiving thermal-energy signals and depicting them as visual signals in an indicator the method comprising, scanning an area in a repetitive back and forth movement, collecting thermal-energy radiation from said area, initiating signal pulses corresponding to variations in the amounts of said collected radiation, said signal pulses being of opposite polarity for opposite directions of scan, reversing the polarity of only those pulses which are produced during alternate half cycles of the repetitive movement, said reversing means comprising a balanced circuit network and switching devices energized upon each end reversal of said repetitive movement.

References Cited in the file of this patent

UNITED STATES PATENTS

| | | |
|---|---|---|
| 2,221,115 | Shephard | Nov. 12, 1940 |
| 2,237,193 | Mobsby | Apr. 1, 1941 |
| 2,288,766 | Wolff | July 7, 1942 |
| 2,334,085 | Graves et al. | Nov. 9, 1943 |
| 2,369,622 | Toulon | Feb. 13, 1945 |
| 2,410,317 | Jolson | Oct. 29, 1946 |
| 2,422,975 | Nicholson | June 24, 1947 |
| 2,448,059 | Smith | Aug. 31, 1948 |

OTHER REFERENCES

Lewis: Electrical Counting, the Macmillan Co., New York, pp. 71–76.